US008935782B2

(12) United States Patent
Christodorescu et al.

(10) Patent No.: US 8,935,782 B2
(45) Date of Patent: Jan. 13, 2015

(54) MALWARE DETECTION VIA NETWORK INFORMATION FLOW THEORIES

(71) Applicant: International Business Machines Corporation, Armonk, NY (US)

(72) Inventors: Mihai Christodorescu, Briarcliff Manor, NY (US); Andrew Davidson, Madison, WI (US); Reiner Sailer, Scarsdale, NY (US); Wietse Venema, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 13/758,811

(22) Filed: Feb. 4, 2013

(65) Prior Publication Data

US 2014/0223560 A1    Aug. 7, 2014

(51) Int. Cl.
*G06F 11/00* (2006.01)
*G06F 21/56* (2013.01)
*G06F 21/52* (2013.01)

(52) U.S. Cl.
CPC ............... *G06F 21/56* (2013.01); *G06F 21/52* (2013.01)
USPC .................................. 726/22; 726/23; 726/24

(58) Field of Classification Search
USPC ............... 726/22–26; 713/187–188; 709/224
See application file for complete search history.

(56) References Cited

U.S. PATENT DOCUMENTS

| | | | |
|---|---|---|---|
| 6,338,141 B1 * | 1/2002 | Wells | 726/24 |
| 7,065,789 B1 * | 6/2006 | Neyman et al. | 726/24 |
| 7,269,851 B2 * | 9/2007 | Ackroyd | 726/24 |
| 7,434,260 B2 * | 10/2008 | Hong et al. | 726/22 |
| 2004/0268322 A1 | 12/2004 | Chow | |
| 2006/0128406 A1 | 6/2006 | Macartney | |
| 2007/0150934 A1 | 6/2007 | Fiszman | |
| 2008/0313734 A1 | 12/2008 | Rozenberg | |
| 2012/0304244 A1 * | 11/2012 | Xie et al. | 726/1 |

OTHER PUBLICATIONS

David Dagon, et al. "A Taxonomy of Botnet Structures", Computer Security Applications Conference, 2007. ACSAC 2007.
Wei Lu, et al. "Automatic Discovery of Botnet Communities on Large-Scale Communication Networks". ASIACCS'09, Mar. 10-12, 2009, Sydney, NSW, Australia.
Thomas Karagiannis, et al. "BLINC: Multilevel Traffic Classification in the Dark". SIGCOMM'05, Aug. 22-26, 2005, Philadelphia, Pennsylvania, USA.
Elizabeth Stinson, et al. "Characterizing Bots' Remote Control Behavior". pp. 89-108, Springer Berlin Heidelberg,2007.
Weidong Cui, et al. "Design and Implementation of an Extrusion-based Break-In Detector for Personal Computers". Computer Security Applications Conference, Dec. 5-9, 2005.

(Continued)

*Primary Examiner* — Hosuk Song
(74) *Attorney, Agent, or Firm* — Anne Dougherty; Otterstedt, Ellenbogen & Kammer, LLP (57) ABSTRACT

Access is obtained to a plurality of information flow theories for a plurality of malicious programs. The information flow theories include differences in information flows between the malicious programs, executing in a controlled environment, and information flows of known benign programs. Execution of a suspicious program is monitored by comparing runtime behavior of the suspicious program to the plurality of information flow theories. An alarm is output if the runtime behavior of the suspicious program matches at least one of the plurality of information flow theories.

14 Claims, 4 Drawing Sheets

(56) References Cited

OTHER PUBLICATIONS

Jim Chow, et al. "Shredding Your Garbage: Reducing Data Lifetime Through Secure Deallocation". SSYM'05 Proceedings of the 14th conference on USENIX Security Symposium, 2005.

Elizabeth Stinson, et al. "Towards Systematic Evaluation of the Evadability of Bot/Botnet Detection Methods". Jul. 2008.

Jim Chow, et al. "Understanding Data Lifetime via Whole System Simulation". USENIX, Security '04 Paper, 2004.

* cited by examiner

MALWARE DETECTION VIA NETWORK INFORMATION FLOW THEORIES

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to cybersecurity and the like.

BACKGROUND OF THE INVENTION

Cybersecurity remains a significant concern in today's interconnected world, as attackers become increasingly sophisticated in their malicious actions. Most malware attacks result in a distributed system, formed by the infected hosts actually used to perform the malicious activity, the support hosts (who might be infected or otherwise under the control of the attacker), and the machine(s) directly used by the attacker to control the malware network. Botnets are one example of such distributed systems. Spyware and advanced persistent threats (APTs) each form similarly distributed systems. For example, spyware is often used to collect sensitive information from infected machines and send it to one or more central servers, which in turn propagate the sensitive information to (human or not) agents that use this information to obtain access to more systems or to financial instruments.

Botnets are particularly dangerous because they can be used to launch large-scale, coordinated attacks such as distributed denial of service, spamming, and click fraud based on commands by an external controller.

SUMMARY OF THE INVENTION

Principles of the invention provide techniques for malware detection via network information flow theories. In one aspect, an exemplary method includes the step of obtaining access to a plurality of information flow theories for a plurality of malicious programs. The information flow theories include differences in information flows between the malicious programs, executing in a controlled environment, and information flows of known benign programs. Further steps include monitoring execution of a suspicious program by comparing runtime behavior of the suspicious program to the plurality of information flow theories; and outputting an alarm if the runtime behavior of the suspicious program matches at least one of the plurality of information flow theories.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

reduced performance overhead as compared to host-based tools;
harder to evade than network-based tools;
not constrained by organizational boundaries;
no need to change application software;
user-independent;
ability to combine host and network data to identify attacks;
independent of the programming language and software development tools used by the creator of the malware;
independent of the target operating system.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

As noted above, cybersecurity remains a significant concern in today's interconnected world, as attackers become increasingly sophisticated in their malicious actions. Most malware attacks result in a distributed system, formed by the infected hosts actually used to perform the malicious activity, the support hosts (who might be infected or otherwise under the control of the attacker), and the machine(s) directly used by the attacker to control the malware network. Botnets are one example of such distributed systems. Spyware and advanced persistent threats (APTs) each form similarly distributed systems. For example, spyware is often used to collect sensitive information from infected machines and send it to one or more central servers, which in turn propagate the sensitive information to (human or not) agents that use this information to obtain access to more systems or to financial instruments.

Botnets are particularly dangerous because they can be used to launch large-scale, coordinated attacks such as distributed denial of service, spamming, and click fraud based on commands by an external controller.

Advantageously, one or more embodiments are not limited to focusing on incidental properties of the bot's network behavior, and thus, one or more embodiments are not easy to evade. Furthermore, one or more embodiments are not limited to focusing on intrinsic host behavior of the bot, and thus do not require a large software footprint on each host.

One or more embodiments, unlike host-based tools for dealing with malicious distributed systems, are not limited by the performance overhead they impose. Furthermore, one or more embodiments, unlike network-based tools, are not limited by the lack of visibility into the semantics of the network traffic (due to encryption, tunneling, etc.), and thus are not easy to evade. In one or more embodiments, defenders are not limited by organizational boundaries.

One or more embodiments combine minimal information from the network and minimal information from hosts in order to detect new, previously unknown malware. Using minimal information from the network (e.g., just the IP addresses used to communicate between hosts) renders moot the evasion techniques potentially used by malware writers. Using minimal information from the hosts (e.g., just a summary of how the information flows through the host programs) captures the intent of the malware without any particular artifacts that could be used for evasion. By combining these two approaches, one or more embodiments create a powerful mechanism for strengthening cybersecurity in a variety of settings, from enterprise networks to government networks to consumer-level ISPs.

In one or more embodiments, there are three phases of operation: an information-flow-theory construction phase, a malware-detection phase, and a detection-optimization phase.

One or more embodiments include a collection of agents, where one agent monitors the network and multiple agents monitor hosts (one per host). Each agent collects the information it is tasked with (from the network or the host) and then the agents communicate securely to exchange summaries of the collected information. The summaries are checked against a complete list of malicious information flow patterns. If a summary indicates the presence of malware, an alert is raised.

One significant part of one or more embodiments includes analysis tools for constructing the malicious information flow patterns used in detection. These tools run a known malware sample in a contained environment to obtain a detailed information flow summary. The detailed information flow summary is then compared against information flow summaries obtained from other malware and benign samples. The differences between different information flow summaries form a malicious information flow pattern.

Another significant part of one or more embodiments includes a technique for the automatic selection of detection algorithms to be used by the monitoring agents, together with a collection of detection techniques. For each type of malicious information flow pattern, one of many detection techniques can be used. Each detection technique has an operating overhead and an accuracy level associated with it. Based on configuration settings, one or more embodiments automatically select the techniques best suited, given a budget for operating overhead or a desired level of accuracy in detection.

One or more embodiments are advantageously not restricted to detecting attacks based on the presence of "new suspected executables." One or more embodiments detect attack based on how information travels (or flows) between hosts on the network and within a host. Advantageously, one or more embodiments are not limited to network-only monitoring in order to detect attacks; rather, one or more embodiments combine data from the network together with data from hosts in order to identify attacks.

Further, one or more embodiments are configured to detect attacks, and do not require changing software to prevent attacks.

Yet further, one or more embodiments are user-independent (i.e., do not rely on user identities to perform detection) and one or more embodiments combine both host and network data.

Phase I: Construction of Information Flow Theories

Figure 1:
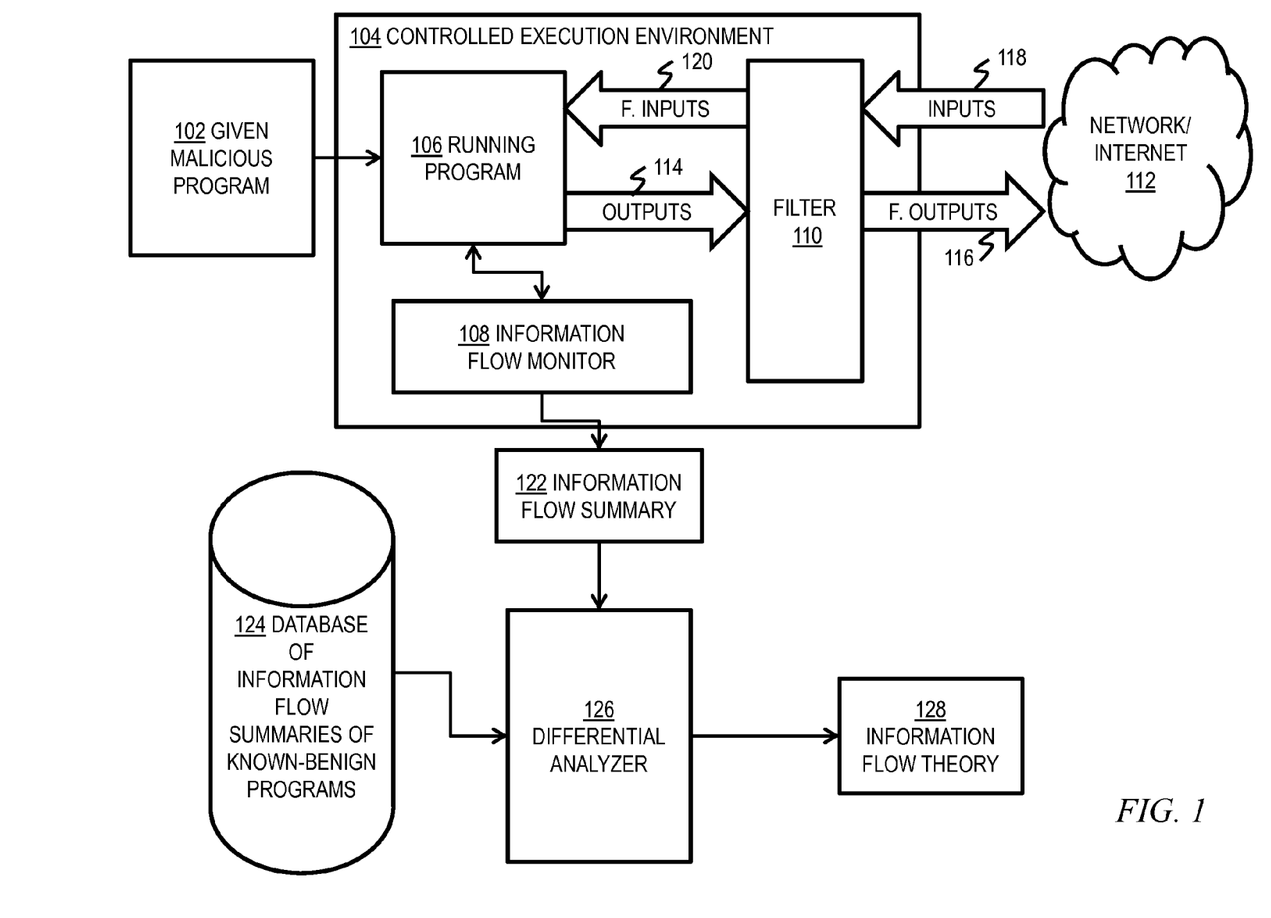
FIG. 1 depicts construction of information flow theories, according to an aspect of the invention.

In one or more embodiments, the goal of this phase is to construct an information flow theory from a given malicious program. Referring now to FIG. 1, to achieve this, the malicious program 102 is run in a controlled execution environment 104 that is enhanced with an information flow monitor 108. The information flow monitor 108 collects data about the program's execution and feeds this data in the form of an information flow summary 122 into a differential analyzer 126. The differential analyzer 126 compares the information flow summary 122 with a database 124 of other information flow summaries and derives the information flow theory 128, as the set of minimal differences that are unique to the information flow summary 122. The information theory thus includes subcomponents of the information flow summary 122 that do not appear in any of the information flow summaries stored in the database 124.

Furthermore in this regard, an information flow summary is, in essence, a list of rules that describe how a program works. Differential analyzer 126 performs the aforementioned comparison to determine the smallest part of the information flow summary that distinguishes program 102 from benign programs characterized in database 124.

A malicious program 102 is a software program known to be malicious. This includes, but is not restricted to, viruses, worms, so-called Trojan horses (programs with a benign capability that conceals another malicious program), bots, and spyware.

A controlled execution environment 104 is a specially set up computing environment that includes all of the components required by the malicious program to execute properly (i.e., an operating system and system libraries, input/output facilities, and the like), together with an information flow monitor 108 and a filter 110. For the purpose of automation, the controlled execution environment 104 does not require interaction with a user, but makes use of a simulated or otherwise generated user input (e.g., mouse, keyboard, touchscreen). The controlled execution environment 104 is designed to appear as close to a real computing environment as possible. This includes measures to hide the presence of the information flow monitor 108 and of the filter 110. A non-limiting example of a controlled execution environment 104 is a QEMU-based emulation system together with firewall policies to filter network activity (QEMU stands for "Quick EMUlator" and is a processor emulator that relies on dynamic binary translation to achieve a reasonable speed while being easy to port to new host CPU architectures). The skilled artisan is familiar with QEMU and, given the teachings herein, will be able to utilize same to implement one or more embodiments.

A running program 106 represents an instantiation of the malicious program 102 in the controlled execution environment 104.

A filter 110 is a set of tools that provide control over the inputs received and the outputs generated by the running program 106 and a set of policies that drive these controls. Inputs 118 include network connections, keyboard, mouse, and other user input derives, and storage disks. Outputs 114 include network connections, display monitors, printers, and storage disks. The goal of the filter 110 is to limit the damage done by the running program 106 to systems external to the controlled execution environment 104; for example, other systems connected to the Internet 112 (or other network). The action of filter 110 is shown at 120 where inputs 118 are filtered to obtain filtered inputs 120, and at 116, where outputs 114 are filtered to obtain filtered outputs 116.

Information Flow Monitor 108 implements fine-grained monitoring of the input data as it is received by the program, processed, and then re-combined to create the output of the program. A non-limiting example of information flow monitor implementations includes a QEMU emulator modified to perform taint tracking on chosen input channels, and a hardware-based system for taint tracking.

Information flow summary 122 describes succinctly how the inputs to a running program 106 relate to the outputs from the same program. These relationships include direct flows from inputs to outputs (when part of the input data is directly copied into part of the output) and indirect flows (when part of the input data influences the output values).

Differential analyzer 126 takes an information flow summary 122 for a malicious program 102 and compares it against one or more information flow summaries 124 for benign programs. The result of the comparison is a subset of the relationships in the information flow summary for the malicious program that do not appear in any of the database-stored information flow summaries, thus distinguishing that summary from all of the other summaries.

Information flow theory 128 is the output of the differential analyzer 126 and describes the input-to-output relationships that are unique to the corresponding malicious program 102.

Further non-limiting exemplary details will now be provided regarding suitable analysis tools for constructing the malicious information flow theories used in detection. Exemplary analysis tools for constructing the malicious information flow theories (as the information flow monitor 108 and the differential analyzer 126 do) include tools that can analyze a program either based on its source or binary code or based on its execution operations, and which can extract the precise patterns in which input data flows through the program to its outputs. Inputs can refer in this case to keyboard or mouse activity, input files, or data received from the network. Outputs refer to data displayed on a screen, written to a file, or sent over the network. Non-limiting examples of such analysis tools include binary static analysis toolkits, dynamic taint tracking systems, or any combination of static and dynamic analyses.

In one exemplary process flow, malicious program(s) 102 are analyzed by static information flow analysis tools to obtain information flow summaries. In another exemplary process flow, malicious program(s) 102 are executed in execution environment 104 and a dynamic information flow analysis tool is used to obtain the information flow summaries.

Exemplary execution environments include virtual machines, emulators, and custom taint-tracking hardware.

Phase II: Malware Detection Using Information Flow Theories

Figure 2:
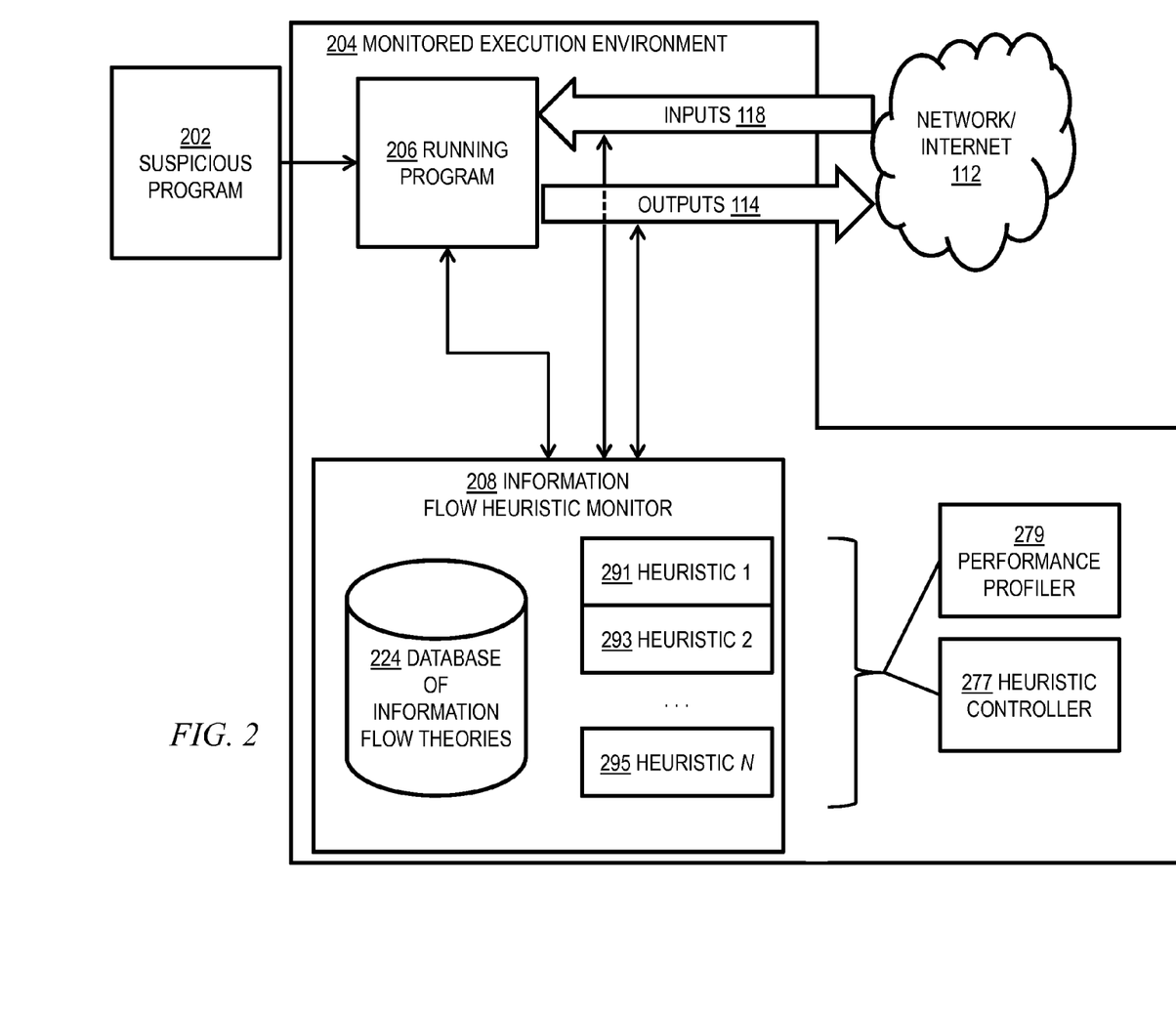
FIG. 2 depicts malware detection using information flow theories, according to an aspect of the invention.

Reference should now be had to FIG. 2. In one or more embodiments, the goal of this phase is to detect previously unknown malicious programs by matching their runtime behavior against one or more information flow theories derived from repeated application of Phase I. To achieve this, a suspicious program 202 is run in a monitored execution environment 204 that is enhanced with an information flow heuristic monitor and detector 208. If the information flow heuristic monitor 208 observes a match between the suspicious program 202 and an information-flow theory in database 224, an alert is raised.

A suspicious program 202 is a software program whose malicious status is unknown and has to be determined.

A monitored execution environment 204 is a specially set up computing environment that includes all of the components required by the suspicious program 202 to execute properly (i.e., an operating system and system libraries, input/output facilities, and the like), together with an information flow heuristic monitor 208. The monitored execution environment 204 is designed to allow normal interaction with a user, such that the user can make use of the suspicious program 202. The monitored execution environment 204 is designed to appear as close to a real computing environment as possible. This includes measures to hide the presence of the information flow heuristic monitor 208. A non-limiting example of a monitored execution environment is a standard installation of the Microsoft Windows® operating system together with a host-based intrusion detection system (registered mark of Microsoft Corporation, Redmond, Wash., United States).

A running program 206 is an instantiation of the suspicious program 202 in the monitored execution environment 204.

Inputs 118 and outputs 114 are as defined above in "Phase I: Construction of Information Flow Theories"; as is network/Internet 112.

Information flow monitor 208 observes the inputs 118 received by the running program, the outputs 114 generated by the running program, and some internal state and computation of the running program. Information flow monitor 208 makes use of a database 224 of information-flow theories and one or more heuristics 291, 293, 295. The information-flow monitor 208 takes the information-flow facts generated by the heuristics 291, 293, 295 and matches them continuously, while the running program is still executing, against each of the information-flow theories in the database 224. If some subset of the information-flow facts generated up to now fully matches one of the information-flow theories, an alert is raised.

The database 224 of information-flow theories includes a collection of information-flow theories constructed (as described above in "Phase I: Construction of Information Flow Theories") from a number of known malicious programs.

A heuristic 291, 293, 295 is an analytical component which, based on one or more data elements observed from the inputs 118, the outputs 114, or the running program 206 itself, produces information-flow facts that can be used by the information-flow monitor 208. An information-flow fact describes how some part of an input to the running program affects some part of an output from the same running program.

Pertinent differences between a heuristic 291, 293, 295 and the fine-grained information-flow monitor 108 from Phase I are that the heuristic has significantly reduced performance overhead and that the heuristic has potentially increased error rates (i.e., it can generate incorrect information-flow facts or it can fail to generate information-flow facts when it should). Different heuristics can have different performance overheads and different accuracies, thus exhibiting a useful trade-off between overhead and accuracy.

Phase III: Detection Optimization

In one or more embodiments, the goal of this detection-optimization phase is to reduce the number of heuristics used by the information-flow heuristic monitor 208 of "Phase II: Malware Detection Using Information Flow Theories," thus reducing the performance overhead imposed on the running program 206 in the monitored execution environment 204. This is achieved by using an optional performance profiler 279 that measures the performance overhead of each heuristic 291, 293, 295 and an optional heuristic controller 277 that enables or disables, in a dynamic fashion, each heuristic while the running program executes.

Initially, when the running program first starts executing, all of the heuristics 291, 293, 295 are enabled. The heuristic controller 277 uses the performance measurements produced by the performance profiler 279 together with one or more strategies to determine whether and when a heuristic should be disabled or re-enabled.

Non-limiting exemplary details will now be provided regarding a procedure for the automatic selection of detection techniques used by the monitoring agents 208. When performing detection based on malicious information flow theories 224, there might exist a variety of heuristic detection techniques 291, 293, 295 with different performance characteristics (in terms of the overhead they impose on the monitored system 204) and correspondingly different accuracy characteristics (in terms of the level of detail observed in the information flow). Since these techniques present distinct trade-offs between performance and accuracy, and since it is often the case that these trade-offs depend on the workload running in the monitored system, it is desirable to have a way to automatically select which algorithms are to be used based on the characteristics of the monitored workload. The detection algorithms can be selected at the beginning of the execution of the monitored workload, or can be varied during the execution as required by a desired performance goal. In one or more embodiments, an exemplary process flow includes monitoring a workload with a runtime monitor, leading to detection technique selection, which is then fed back to the runtime monitor for use in the monitoring process, via a feedback loop.

Recapitulation

Thus, one or more embodiments are directed to detecting malicious information flow patterns. One or more embodiments include an analysis tool for identifying malware and/or malicious information flow patterns in a network having a plurality of hosts. The tool includes at least one monitoring agent for monitoring network communication activity during program execution; a plurality of host monitoring agents for monitoring communication activity for the plurality of hosts during program execution; and a processing component for comparing the monitored communication activity to known malicious information flow patterns and identifying a program as malware by identifying malicious information flow patterns based on the comparing.

In some instances, known malicious information flow patterns are stored based on analysis of known malware.

In some cases, the processing component can analyze a program either based on its source or binary code or based on its execution operations.

In some embodiments, the processing component can extract the precise patterns in which input data flows through the program to its outputs. Inputs can refer to keyboard or mouse activity, input files, or data received from the network and outputs refer to data displayed on a screen, written to a file, or sent over the network.

In some instances, the processing component includes a binary static analysis toolkit and/or a dynamic taint tracking system, and/or any combination of static and dynamic analyses toolkits.

In another aspect, a method for identifying malware and/or malicious information flow patterns in a network having a plurality of hosts includes monitoring network communication activity during program execution; monitoring communication activity for the plurality of hosts during program execution; comparing the monitored communication activity to known malicious information flow patterns; and identifying a program as malware by identifying malicious information flow patterns based on the comparing.

In some cases, an additional step includes automatically selecting detection techniques used by the monitoring agents.

Given the discussion thus far, it will be appreciated that, in general terms, an exemplary method, according to an aspect of the invention, includes the step of obtaining access to a plurality of information flow theories 224 for a plurality of malicious programs. The information flow theories include differences in information flows between malicious programs 102 executing in a controlled environment 104, and information flows of known benign programs 124. This step can be carried out, for example, by accessing database 224. A further step (see, e.g., FIG. 2) includes monitoring execution of a suspicious program 202 by comparing runtime behavior of the suspicious program to the plurality of information flow theories 224. This step can be carried out, for example, by monitor 208 using data in database 224. A further step includes outputting an alarm if the runtime behavior of the suspicious program matches at least one of the plurality of information flow theories. This step can be carried out, for example, by monitor 208.

In some cases, the monitoring includes comparing information flow facts about the runtime behavior of the suspicious program generated by a plurality of heuristics 291, 293, 295 to the plurality of information flow theories 224. In some cases, the comparison is concurrent.

Figure 4:
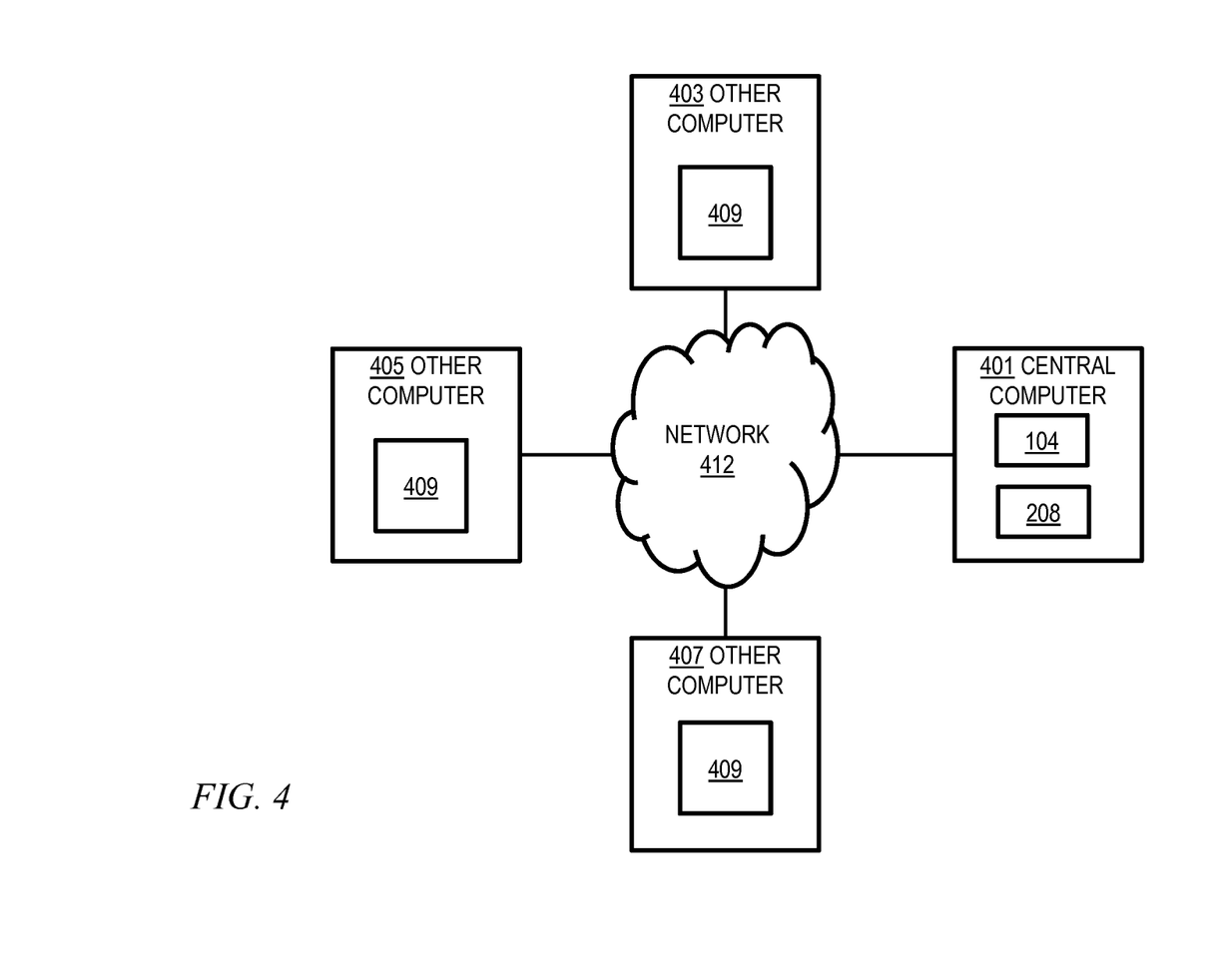
FIG. 4 depicts a distributed approach using lightweight agents, in accordance with an aspect of the invention.

It should be noted that in some cases, only a single computer is involved. However, as seen in FIG. 4, other instances address a network 412 of interconnected computers 401, 403, 405, 407. In such a networked environment, a single central computer 401 could carry out the functionality in FIG. 1. The other computers 403, 405, 407 could implement the full monitored execution environment 204, or, as shown, monitor 208 could run on central computer 401 with lightweight monitoring agents 409 on the other computers 403, 405, 407 which report back to the central computer 401.

As described with respect to Phase III, in some instances, additional steps include initially using all of the plurality of heuristics (e.g., 1 to N); monitoring performance overhead of each of the plurality of heuristics (e.g., with profiler 279); and subsequently using a subset of the plurality of heuristics, based on the monitoring of the overhead, and at least one strategy. This process preferably continues; i.e., additional steps can include monitoring performance overhead of each heuristic of the subset of heuristics; and subsequently increasing the number of heuristics in the subset of the plurality of heuristics, based on the monitoring of the overhead of each heuristic of the subset of heuristics, and the at least one strategy. Increasing and decreasing the number of heuristics used can be carried out, for example, with controller 277.

As seen in FIG. 1, in some cases, the obtaining of the plurality of information flow theories includes generating the plurality of information flow theories for the plurality of malicious programs by comparing the differences in the information flows between the malicious programs 102, executing in the controlled environment 104, and the information flows 124 of the known benign programs. This step can be carried out, for example, with the differential analyzer 126 using database 124 and summaries 122 obtained from environment 104. In other instances, the contents of database 224 could be obtained from an external party that carries out the process depicted in FIG. 1.

Figure 3:
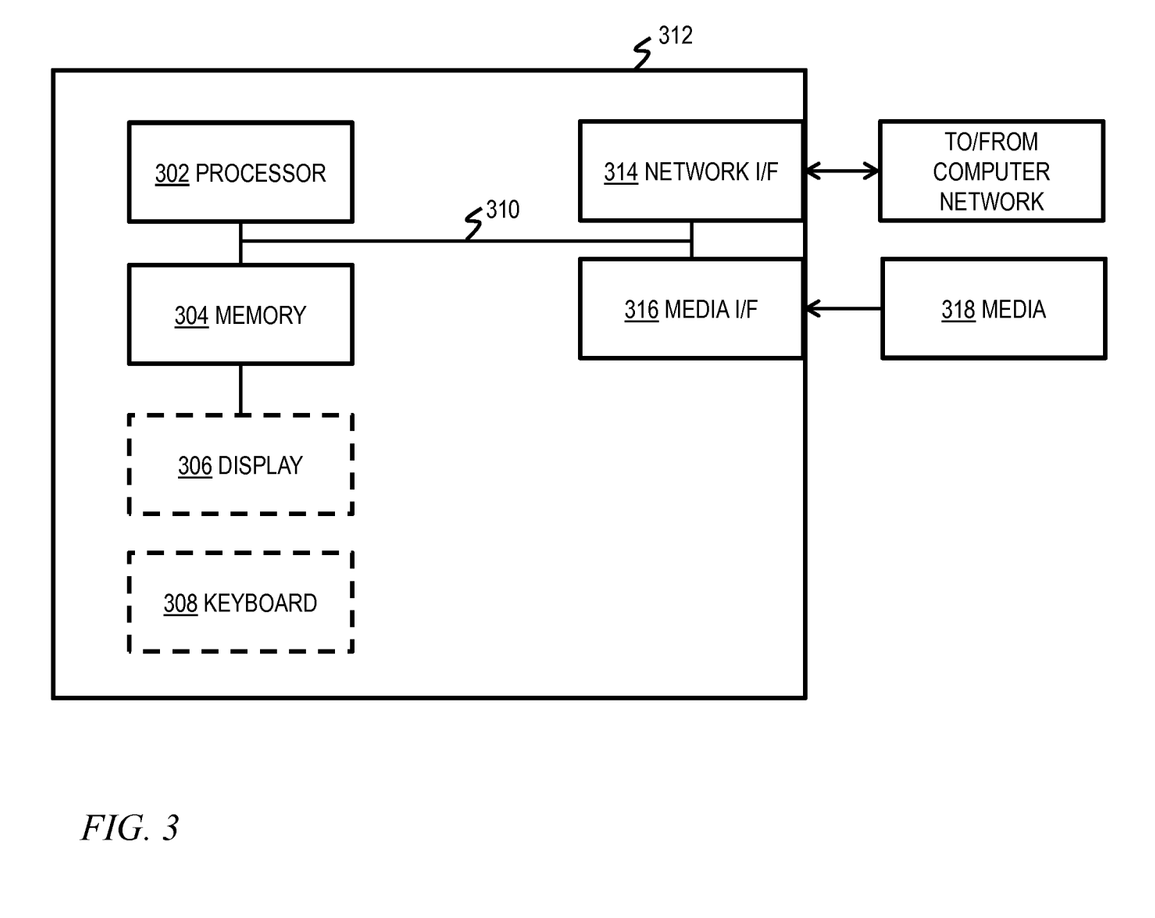
FIG. 3 depicts a computer system that may be useful in implementing one or more aspects and/or elements of the invention.

In some instances, an additional step includes providing a system, wherein the system includes distinct software modules. Each of the distinct software modules is embodied on a computer-readable storage medium, and the distinct software modules include an information flow theory database module to implement database 224 and an information flow heuristic monitoring module to implement monitor 208. In such instances, the obtaining step is carried out via the information flow theory database module executing on at least one hardware processor 302; the monitoring is carried out by the information flow heuristic monitoring module executing on the at least one hardware processor; and the outputting is carried out by the information flow heuristic monitoring module executing on the at least one hardware processor.

By way of additional non-limiting details, in some cases, controlled execution of a malicious program is carried out by the input/output filter module 110 within controlled execution environment 104; collection of information flow summaries is carried out by the information flow monitor module 108; creation of the information flow theory is carried out by the differential analysis module 126 and the info-flow summary database module 124; monitored execution of a suspicious program is carried out by the information flow heuristic monitor module 208; and detection of malicious software is carried out by the information flow heuristic monitor module 208 and the info-flow theory database module 224.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, an information flow theory database module to implement database 224 and an information flow heuristic monitoring module to implement monitor 208; more generally, any one, some, or all of the software-implementable components in FIGS. 1, 2, and 4. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining access to a plurality of information flow theories for a plurality of malicious programs, said information flow theories comprising differences in information flows between said malicious programs, executing in a controlled environment, and information flows of known benign programs;
    monitoring execution of a suspicious program by comparing runtime behavior of said suspicious program to said plurality of information flow theories; and
    outputting an alarm if said runtime behavior of said suspicious program matches at least one of said plurality of information flow theories,
    wherein said monitoring comprises comparing information flow facts about said runtime behavior of said suspicious program generated by a plurality of heuristics to said plurality of information flow theories,
    said method further comprising:
        initially using all of said plurality of heuristics;
        monitoring performance overhead of each of said plurality of heuristics; and
        subsequently using a subset of said plurality of heuristics, based on said monitoring of said overhead, and at least one strategy.

2. The method of claim 1, further comprising:
    monitoring performance overhead of each heuristic of said subset of heuristics; and
    subsequently increasing a number of heuristics in said subset of said plurality of heuristics, based on said monitoring of said overhead of each heuristic of said subset of heuristics, and said at least one strategy.

3. The method of claim 1, wherein said obtaining of said access to said plurality of information flow theories comprises generating said plurality of information flow theories for said plurality of malicious programs by comparing said differences in said information flows between said malicious programs, executing in said controlled environment, and said information flows of said known benign programs.

4. The method of claim 1, further comprising providing a system, wherein the system comprises distinct software modules, each of the distinct software modules being embodied on a non-transitory computer-readable storage medium, and wherein the distinct software modules comprise an information flow theory database module and an information flow heuristic monitoring module;
    wherein:
        said obtaining step is carried out via said information flow theory database module executing on at least one hardware processor;
        said monitoring is carried out by said information flow heuristic monitoring module executing on said at least one hardware processor; and
        said outputting is carried out by said information flow heuristic monitoring module executing on said at least one hardware processor.

5. A computer program product comprising a non-transitory computer readable storage medium having computer readable program code embodied therewith, said computer readable program code comprising:
    computer readable program code configured to obtain access to a plurality of information flow theories for a plurality of malicious programs, said information flow theories comprising differences in information flows between said malicious programs, executing in a controlled environment, and information flows of known benign programs;
    computer readable program code configured to monitor execution of a suspicious program by comparing runtime behavior of said suspicious program to said plurality of information flow theories; and
    computer readable program code configured to output an alarm if said runtime behavior of said suspicious program matches at least one of said plurality of information flow theories,
    wherein said computer readable program code configured to monitor comprises computer readable program code configured to compare information flow facts about said runtime behavior of said suspicious program generated by a plurality of heuristics to said plurality of information flow theories,
    said computer readable program code further comprising:
        computer readable program code configured to initially use all of said plurality of heuristics;
        computer readable program code configured to monitor performance overhead of each of said plurality of heuristics; and
        computer readable program code configured to subsequently use a subset of said plurality of heuristics, based on said monitoring of said overhead, and at least one strategy.

6. The computer program product of claim 5, further comprising:
    computer readable program code configured to monitor performance overhead of each heuristic of said subset of heuristics; and
    computer readable program code configured to subsequently increase a number of heuristics in said subset of said plurality of heuristics, based on said monitoring of said overhead of each heuristic of said subset of heuristics, and said at least one strategy.

7. The computer program product of claim 5, wherein said computer readable program code configured to obtain said access to said plurality of information flow theories comprises computer readable program code configured to generate said plurality of information flow theories for said plurality of malicious programs by comparing said differences in said information flows between said malicious programs, executing in said controlled environment, and said information flows of said known benign programs.

8. An apparatus comprising:
    a memory; and
    at least one processor, coupled to said memory, and operative to:
        obtain access to a plurality of information flow theories for a plurality of malicious programs, said information flow theories comprising differences in information flows between said malicious programs, executing in a controlled environment, and information flows of known benign programs;
        monitor execution of a suspicious program by comparing runtime behavior of said suspicious program to said plurality of information flow theories; and output an alarm if said runtime behavior of said suspicious program matches at least one of said plurality of information flow theories,
wherein said at least one processor is operative to monitor by comparing information flow facts about said runtime behavior of said suspicious program generated by a plurality of heuristics to said plurality of information flow theories,
wherein said at least one processor is further operative to:
initially use all of said plurality of heuristics;
monitor performance overhead of each of said plurality of heuristics; and
subsequently use a subset of said plurality of heuristics, based on said monitoring of said overhead, and at least one strategy.

9. The apparatus of claim 8, wherein said at least one processor is further operative to:
monitor performance overhead of each heuristic of said subset of heuristics; and
subsequently increase a number of heuristics in said subset of said plurality of heuristics, based on said monitoring of said overhead of each heuristic of said subset of heuristics, and said at least one strategy.

10. The apparatus of claim 8, wherein said at least one processor is operative to obtain said access to said plurality of information flow theories by generating said plurality of information flow theories for said plurality of malicious programs by comparing said differences in said information flows between said malicious programs, executing in said controlled environment, and said information flows of said known benign programs.

11. The apparatus of claim 8, further comprising a plurality of distinct software modules, each of the distinct software modules being embodied on a non-transitory computer-readable storage medium, and wherein the distinct software modules comprise an information flow theory database module and an information flow heuristic monitoring module;
wherein:
said at least one processor is operative to obtain by executing said information flow theory database module;
said at least one processor is operative to monitor by executing said information flow heuristic monitoring module; and
said at least one processor is operative to output is carried out by executing said information flow heuristic monitoring module.

12. An apparatus comprising:
means for obtaining access to a plurality of information flow theories for a plurality of malicious programs, said information flow theories comprising differences in information flows between said malicious programs, executing in a controlled environment, and information flows of known benign programs;
means for monitoring execution of a suspicious program by comparing runtime behavior of said suspicious program to said plurality of information flow theories; and
means for outputting an alarm if said runtime behavior of said suspicious program matches at least one of said plurality of information flow theories,
wherein said means for monitoring comprise means for comparing information flow facts about said runtime behavior of said suspicious program generated by a plurality of heuristics to said plurality of information flow theories
said apparatus further comprising:
means for initially using all of said plurality of heuristics;
means for monitoring performance overhead of each of said plurality of heuristics; and
means for subsequently using a subset of said plurality of heuristics, based on said monitoring of said overhead, and at least one strategy.

13. The apparatus of claim 12, further comprising:
means for monitoring performance overhead of each heuristic of said subset of heuristics; and
means for subsequently increasing a number of heuristics in said subset of said plurality of heuristics, based on said monitoring of said overhead of each heuristic of said subset of heuristics, and said at least one strategy.

14. The apparatus of claim 12, wherein said means for obtaining of said access to said plurality of information flow theories comprise means for generating said plurality of information flow theories for said plurality of malicious programs by comparing said differences in said information flows between said malicious programs, executing in said controlled environment, and said information flows of said known benign programs.

\* \* \* \* \*